(12) United States Patent
Aguaviva

(10) Patent No.: US 7,831,780 B2
(45) Date of Patent: Nov. 9, 2010

(54) OPERATING SYSTEM SUPPLEMENTAL DISK CACHING SYSTEM AND METHOD

(75) Inventor: Raul Aguaviva, London (GB)

(73) Assignee: Nvidia Corporation, Santa Clara, CA (US)

( * ) Notice: Subject to any disclaimer, the term of this patent is extended or adjusted under 35 U.S.C. 154(b) by 154 days.

(21) Appl. No.: 11/453,789

(22) Filed: Jun. 14, 2006

(65) Prior Publication Data

US 2006/0294302 A1 Dec. 28, 2006

Related U.S. Application Data

(60) Provisional application No. 60/693,581, filed on Jun. 24, 2005.

(51) Int. Cl.
*G06F 13/18* (2006.01)
(52) U.S. Cl. .................. 711/151; 711/113; 711/158
(58) Field of Classification Search .............. None
See application file for complete search history.

(56) References Cited

U.S. PATENT DOCUMENTS

| | | | |
|---|---|---|---|
| 5,778,426 A | 7/1998 | Dekoning et al. | |
| 5,875,474 A | 2/1999 | Fabrizio et al. | |
| 6,470,429 B1 | 10/2002 | Jones et al. | |
| 6,801,207 B1 * | 10/2004 | Tischler et al. | 345/557 |
| 6,801,208 B2 * | 10/2004 | Keshava et al. | 345/557 |
| 6,963,344 B1 | 11/2005 | Kasprzak et al. | |
| 2003/0140198 A1 | 7/2003 | Ninose et al. | |
| 2003/0200388 A1 | 10/2003 | Hetrick | |
| 2003/0210248 A1 | 11/2003 | Wyatt | |

FOREIGN PATENT DOCUMENTS

EP 1006448 A 6/2000

OTHER PUBLICATIONS

EP 06012909.5 - 2201; Partial European Search Report; Dec. 21, 2007.
EP 06012909.5 - 2201; Extended European Search Report; Mar. 10, 2008.

* cited by examiner

*Primary Examiner*—Than Nguyen

(57) ABSTRACT

A computer system utilizes subsystem supplemental memory resources to implement operating system supplemental disk caching. A main system processor (e.g., a central processing unit) processes information associated with main system functions. A bulk memory (e.g., a hard disk) stores the information. A main system memory (e.g., a main RAM) caches portions of the bulk information. A subsystem supplemental memory (e.g., a graphics subsystem RAM) provides storage capacity for subsystem operations (e.g., graphics operations) and supplemental storage for portions of said bulk information associated with main system functions (e.g., functions performed by the main system processor). Information (e.g., main system information) cached in the subsystem supplemental memory can be accessed by the main system processor directly.

19 Claims, 3 Drawing Sheets

100

Storing information in a bulk storage component.

Caching a portion of the information in a subsystem supplemental memory.

Accessing the subsystem supplemental memory to perform storage operations for a main processing component.

Performing a subsystem supplemental coordination process.

OPERATING SYSTEM SUPPLEMENTAL DISK CACHING SYSTEM AND METHOD

RELATED APPLICATIONS

This Application claims the benefit of a commonly owned and copending U.S. Provisional Patent Application entitled "AN OPERATING SYSTEM SUPPLEMENTAL DISK CACHING SYSTEM AND METHOD", Ser. No. 60/693,581, filed on Jun. 24, 2005, which is incorporated herein by this reference.

FIELD OF THE INVENTION

The present invention relates to the field of information storage systems. In particular the present invention relates to an operating system supplemental disk caching system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Realization of these results often involves processing and storage of significant amounts of information. It is usually important for the information to be communicated from storage mediums to processing units quickly in order to perform a variety of operations properly. However, storage medium or memories typically have an inverse relationship between storage capacity and access speed.

Information processing systems often include a hierarchy of different memory components varying from relatively large storage capacity with slow access capability to smaller storage capacity with relatively rapid access capability. Conventional computer systems typically include a bulk storage component (e.g., a hard disk memory system) and a main system memory (e.g., a random access memory). The bulk storage components such as a hard disk can typically store a relatively large amount of information but reading information from the hard disk or writing information to the hard disk takes a relatively long time. Attempts by a central processing unit to retrieve information directly from a hard disk would significantly slow the overall performance of operations and probably detrimentally impact the end use application results. While a main system memory such as a random access memory (RAM) typically supports faster read and write operations, RAM usually costs significantly more per storage unit (e.g., byte) and typically have relatively limited storage capacity. The limited storage capacity of a conventional main system memory RAM would significantly impact the applications that a computer system could run without a bulk storage component.

Computer systems typically attempt to address the memory size versus speed dilemma by dividing up storage activities between different types of memories in a hierarchical configuration and communicating information between different memory hierarchy components. Processors typically accesses information from a main system memory in relatively fast accesses of small pieces of information. The main system memory in turn exchanges relatively large pieces of information with a relatively slow bulk storage component such as a hard disk. Input and output memory access operations can be a key bottleneck in operating system performance.

The exchange of information within the hierarchy of memories is often referred to as disk caching. A cache is usually a memory that holds recently accessed data in a manner designed to seed up subsequent access to the same data. When data is read from or written to a hard disk a copy is also saved in the cache. The cache monitors disk reads to see if the required data is already in the cache. If the information is already in the cache then the information is returned immediately without attempting a disk read. The disk cache uses the system memory so a "cache hit" takes much less time to complete. However, because system memory is used, operating systems and applications have less memory available for other information.

A common feature of operating systems is a swap file. A swap file uses the hard disk as virtual memory. When more memory is requested than actually physically exists, sections of memory are written to the hard disk to simulate more memory. While the swap files do permit simulation of additional memory, the performance is still degraded in the sense the accessing the information takes longer as the program uses the much slower swap file to retrieve the information from the hard disk.

SUMMARY

Embodiments of the present invention operating system supplemental disk caching system and method provide convenient and efficient information storage and access. Information can be stored and accessed in an automated manner that conserves memory resources and expedites access. The present invention can facilitate flexible access to information by leveraged utilization of subsystem storage components (e.g., a graphics subsystem memory) to store information for a main system processor.

In one embodiment, a computer system utilizes subsystem memory resources to implement operating system supplemental disk caching. A main system processor (e.g., a central processing unit) processes information associated with main system functions. A bulk storage component (e.g., a hard disk) stores the bulk information (e.g., application program instruction and data). A main system memory (e.g., a main system RAM) caches portions of the bulk information. A subsystem supplemental memory (e.g., a graphics subsystem RAM) provides storage capacity for subsystem operations (e.g., graphics operations) and supplemental storage for information associated with main system functions (e.g., functions performed by the main system processor). A subsystem supplemental coordination process is performed information is written from the subsystem supplemental memory to the bulk storage component if a subsystem operation is initiated.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Figure 1:
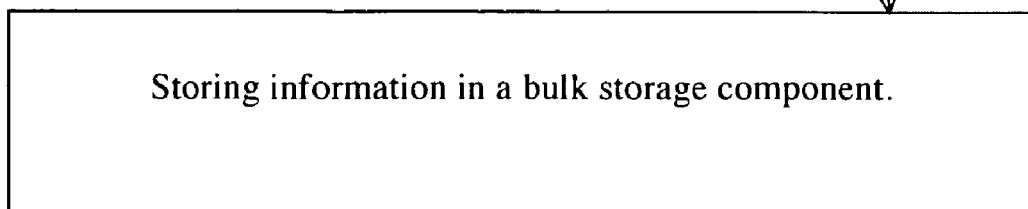
FIG. 1 is a flow chart of an exemplary supplemental caching method in accordance with one embodiment of the present invention.
Figure 1:
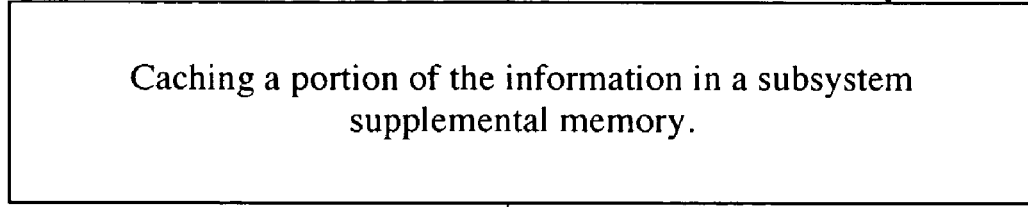
Figure 1:
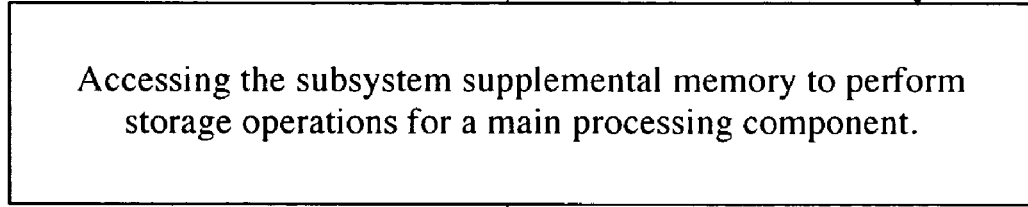
Figure 1:
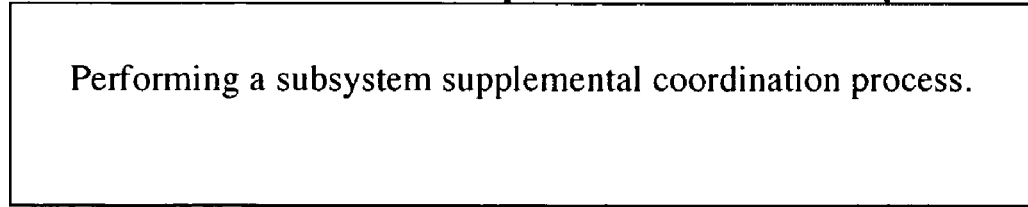

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, logic, other such information storage, transmission or display devices, etc.) into other data similarly represented as physical quantities within other components.

The present invention facilitates efficient and convenient storage of information. In one embodiment of the present invention, flexible hierarchical memory enables leverage utilization of hardware components for information storage and communication activities as well as a variety of other activities. For example, embodiments of a present invention processing device can utilize subsystem supplemental memories (e.g., a graphic subsystem memory) to provide operating disk caching. Information utilized by a variety of main system applications can be stored in secondary subsystem supplemental memories. Leveraged utilization of the storage capabilities of subsystem supplemental memories (e.g., a graphics subsystem memory, etc.) can facilitate rapid and convenient access to the information.

FIG. 1 is a flow chart of exemplary supplemental caching method 100 in accordance with one embodiment of the present invention. In one embodiment supplemental caching method 100 facilitates efficient and convenient storage and access to information in an information processing system. For example, supplemental caching method 100 can utilize otherwise idle subsystem memory to cache main system function information for a main system processor (e.g., a central processing unit).

In step 110, information is stored in a bulk storage component. In one embodiment of the present invention the bulk information is stored on a hard disk. It is appreciated that bulk information can be stored on a variety of bulk storage components including CD-ROMs, DVDs, and/or network files.

In step 120, a portion of the information is cached in a subsystem supplemental memory. In one embodiment, a portion of the information is communicated from the bulk storage component to the subsystem supplemental memory. In one exemplary implementation, the subsystem is a graphics subsystem and the information is cached in a graphics subsystem memory. For example, the information is communicated directly between a hard disk and the graphics subsystem memory.

In step 130, the subsystem supplemental memory is accessed to perform storage operations for a main processing component. In one embodiment, information is communicated directly between the subsystem supplemental memory and the main system processing unit (e.g., a central processing unit). In one embodiment of the present invention, performing storage operations for the main processing component includes writing and reading portions of the information directly between the subsystem supplemental memory and the main processing component.

In step 140, a subsystem supplemental coordination process is performed. In one embodiment, the subsystem supplemental coordination process comprises writing information from the subsystem supplemental memory to the bulk storage component if a subsystem operation is initiated. For example, information is written from the subsystem supplemental memory to the bulk storage component if a subsystem attempts to store primary subsystem function related information in the subsystem supplemental memory. In one embodiment, the information associated with the primary subsystem function is graphics information.

In one embodiment of the present invention, a supplemental caching method (e.g., supplemental caching method 100) includes caching another portion of the information in a main system memory. In one embodiment information associated with a first application is cached in the main system memory and information associated with a second application is cached in the subsystem supplemental memory. In one exemplary implementation, information is exchanged between the main system memory and subsystem supplemental memory. For example, information is written between the subsystem supplemental memory and the main memory.

Figure 2:
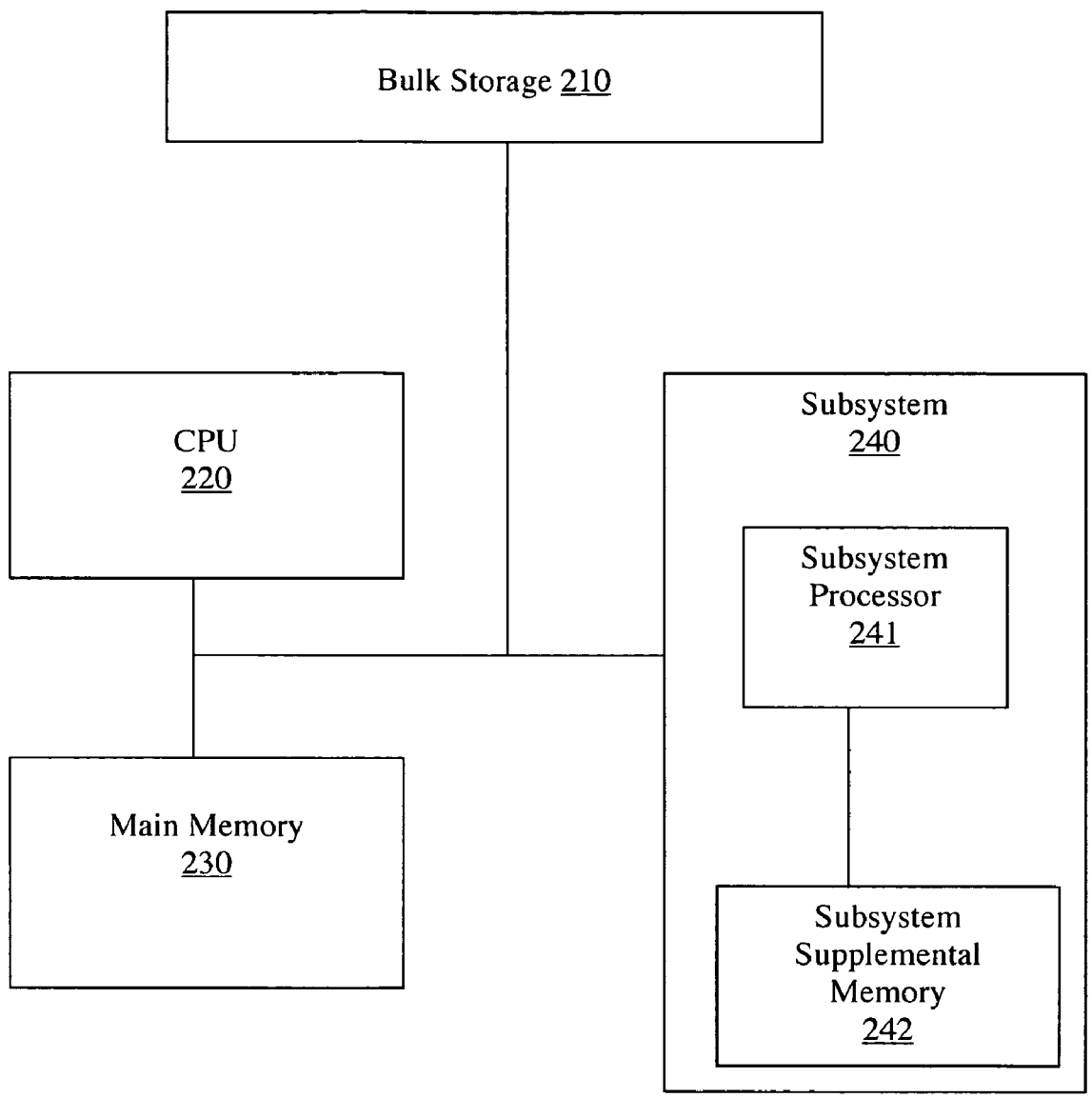
FIG. 2 is a block diagram of an exemplary computer system in accordance with one embodiment of the present invention.

FIG. 2 is a block diagram of exemplary computer system 200 in accordance with one embodiment of the present invention. Computer system 200 includes bulk memory 210, central processing unit (CPU) 220, main memory 230 and secondary subsystem 240. Secondary subsystem 240 includes subsystem processor 241 and subsystem supplemental memory 242. Bulk memory 210, central processing unit (CPU) 220, main memory 230 and secondary subsystem 240 are communicatively coupled to bus 250. Subsystem processor 241 is communicatively coupled to subsystem supplemental memory 242.

The components of computer system 200 cooperatively operate to provide information processing and operating system supplemental disk caching. Bus 250 communicates information between the components of computer system 200. Central processor 220 processes the information. Bulk memory 210 provides bulk storage capacity for the information. Main memory 230 caches portions of the bulk information for central processor 220. Subsystem 240 provides support for subsystem operations (e.g., graphics operations). Subsystem processor 241 processes information associated with subsystem functions (e.g., graphics functions) and subsystem supplemental memory 242 stores information (e.g., frame buffer information) for subsystem processor 241. Subsystem 240 also provides operating system supplemental disk caching capabilities for central processing unit 220. In one exemplary implementation, subsystem supplemental memory 242 caches portions of the bulk information for central processing unit 220. In one embodiment of the present invention, subsystem 240 is a graphics subsystem in which subsystem processor 241 is a graphics processor and subsystem supplement memory 242 is a graphics subsystem memory.

In one embodiment of the present invention, information can be communicated or swapped directly between bulk memory 210 and main memory 230 and/or subsystem supplemental memory 242. In one exemplary implementation, subsystem supplemental memory 242 acts as a main storage component for subsystem processor 241 and as a "supplemental main" memory for central processing unit 220. In one embodiment, storage of information in subsystem supplemental memory 242 is coordinated between main system functions and subsystem functions. In one exemplary implementation, storage of subsystem information (e.g., graphics information) in the secondary subsystem memory is given priority over main system storage. In the present example, subsystem supplemental memory coordination includes writing information associated with main system functions from subsystem supplemental memory to bulk memory before overwriting the main system information with the subsystem information. For example, if subsystem 240 is a graphics subsystem, main system information stored in subsystem supplemental memory 242 is written to bulk memory 210 before graphics operations cause the main memory function information to be overwritten with graphics function information.

Main memory 230 and/or subsystem supplemental memory 242 can operate as a main memory for central processing unit 220. For example, central processing unit 220 can receive a portion of the information directly from subsystem supplemental memory 242 instead of main memory 230. In one embodiment of the present invention, main memory 230 and subsystem supplemental memory 242 are random access memories (RAMs).

It is appreciated that the present invention is readily implemented in a variety of configurations to provide operating system supplemental disk caching. For example, subsystem supplemental memory 242 can cache portions of the bulk information if main memory 230 is full. Main memory 230 and subsystem supplemental memory 242 can swap portions of the bulk information between one another. Main memory 230 can cache a first portion of the bulk information and subsystem main memory 242 can cache a second portion of the bulk information. The present invention can also be applied to accesses of bulk information from a number of components or systems. For example, accesses to hard drives, CD-ROMs, DVDs, and/or network file accesses can be performed by caching information in a subsystem supplemental memory.

Figure 3:
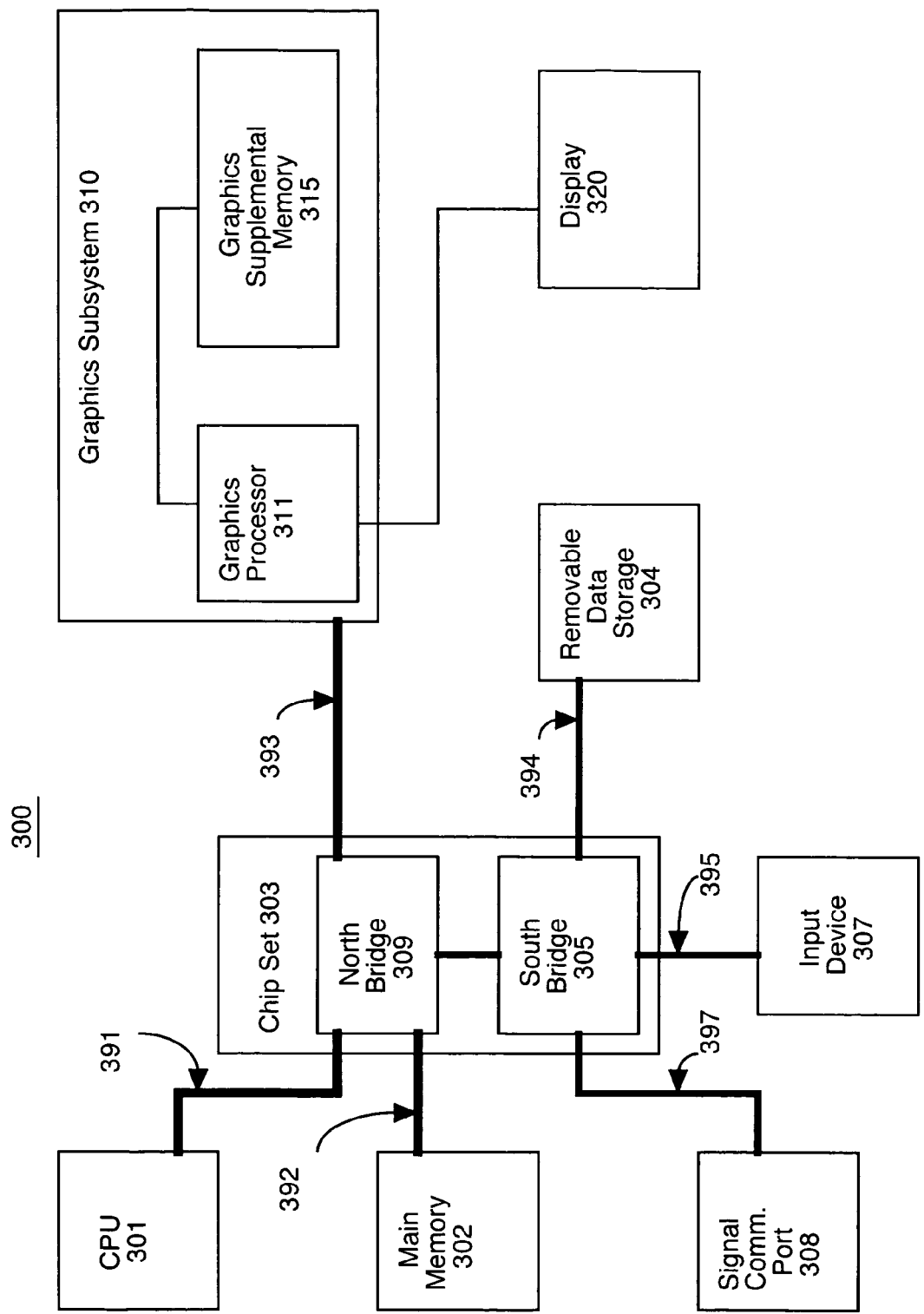
FIG. 3 is a block diagram of an exemplary computer system that includes a graphics subsystem in accordance with one embodiment of the present.

FIG. 3 is a block diagram of a computer system 300, one embodiment of a computer system upon which embodiments of the present invention can be implemented. Computer system 300 includes central processor unit 301, main system memory 302 (e.g., a random access memory), chip set 303 with north bridge 309 and south bridge 305, removable data storage device 304, input device 307, signal communications port 308, and graphics subsystem 310 which is coupled to display 320. Computer system 300 includes several busses for communicatively coupling the components of computer system 300. Communication bus 391 (e.g., a front side bus) couples north bridge 309 of chipset 303 to central processor unit 301. Communication bus 392 (e.g., a main memory bus) couples north bridge 309 of chipset 303 to main system memory 302. Communication bus 393 (e.g., the Advanced Graphics Port interface) couples north bridge of chipset 303 to graphic subsystem 310. Communication buses 394-397 (e.g., a PCI bus) couple south bridge 305 of chip set 303 to removable data storage device 304, input device 307, and signal communications port 308 respectively. Graphics subsystem 310 includes graphics processor 311 and graphics buffer 315.

The components of computer system 300 cooperatively operate to provide presentations of graphics images. Communications bus 391 through 397 communicate information. Central processor 301 processes information. Main system memory 302 stores information and instructions for the central processor 301. Removable data storage device 304 also stores information and instructions (e.g., functioning as a large information reservoir). Removable data storage device can be a variety of different devices including a hard disk, a CD, a DVD, jump drive, etc. Input device 306 provides a mechanism for inputting information and/or for pointing to or highlighting information on display 320. Signal communication port 308 provides a communication interface to exterior devices (e.g., an interface with a network). Display device 309 displays information in accordance with data stored in frame buffer 315.

Graphics subsystem 310 performs graphics operations and provides supplemental memory support for central processing unit 301. Graphics processor 311 processes graphics commands from central processor 301 and provides the resulting data to graphics supplemental memory 315 for storage and retrieval by display monitor 320. For example, graphics supplemental memory 315 can provide frame buffer storage for graphics processor 311. Graphics supplemental memory 315 can also provide supplemental main system storage for central processing unit 301. For example, bulk information can be communicated to graphics supplemental memory 315 from removable data storage component 304 and/or from a network resource (not shown) communicatively coupled to signal communication port 308. The information can then be accessed by central processing unit 301 directly from graphics supplemental memory 315.

It is appreciated that the present invention can be implemented in a variety of embodiments. In one exemplary implementation, the present invention can be utilized in processing systems to provide a variety of graphics applications and unrelated applications. For example, the present invention can be utilized to perform processing in a personal computer, personal digital assistant, cell phone, handheld device or any number of platforms for implementing processing. It is also appreciated that references to computer system implementations are exemplary and the present invention is not limited to conventional computer system implementations but is also readily implemented in a variety of electronic systems that include a main system memory and a subsystem supplemental memory. It is appreciated that the present invention can be implemented in a variety of embodiments. In one exemplary implementation, the present invention can be utilized in processing systems that support a variety of graphics applications including video games. For example, the present invention can be utilized in graphics rendering processes of a game console, personal computer, personal digital assistant, cell phone or any number of platforms for implementing a video game. It is also appreciated that references to video game application implementations are exemplary and the present invention is not limited to these implementations.

Thus, the present invention facilitates efficient and convenient storage and access to information in an information processing system. Embodiments of the present invention support maximized component utilization and advance resource conservation by optimizing storage capacity of subsystem memories for main system operations. Using otherwise idle subsystem memory resources makes more memory available for main system applications, speeds up overall hard disk access operations, enables overall increased virtual memory swap speed and facilitates longer hard disk life (e.g., be reducing the number of hard disk access and associated mechanical wear and tear). Reduced hard drive accesses can also enable power conservation and longer battery life.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. In the claims, the order of elements does not imply any particular order of operations, steps, or the like, unless a particular element makes specific reference to another element as becoming before or after.

What is claimed is:

1. A computer system comprising:
    a bus for communicating information
    a discrete main system processor for processing said information;
    a bulk storage component for storing said information; and
    a subsystem supplemental memory for caching a first portion of said information for said discrete main system processor, wherein said first portion of said information in said subsystem supplemental memory is written and read directly between said subsystem supplemental memory and said discrete main system processor, and wherein a discrete graphics processor has priority to said subsystem supplemental memory when both said discrete main system processor and said discrete graphics processor want access to said subsystem supplemental memory.

2. The computer system of claim 1 wherein said subsystem supplemental memory is a random access memory.

3. The computer system of claim 1 further comprising a main system memory for caching a second portion of said information for a main system processor.

4. The computer system of claim 1 wherein said subsystem supplemental memory is a graphics subsystem memory.

5. The computer system of claim 1 wherein a main system memory and said subsystem supplemental memory swap said first portion of said information between one another.

6. The computer system of claim 1 wherein said discrete graphics processor processes graphics information.

7. The computer system of claim 1 wherein said main system processor receives said first portion of said information from said subsystem supplemental memory.

8. The computer system of claim 1 wherein said first portion of said information cached in said subsystem supplemental memory for said discrete main system processor is written to said bulk memory before subsystem specific information is written to said subsystem supplemental memory.

9. The computer system of claim 1 wherein said first portion of said information cached in said subsystem supplemental memory for said discrete main system processor is written to said bulk memory before being overwritten by graphics information written to said subsystem supplemental memory.

10. A supplemental caching method comprising:
    storing information in a bulk storage component;
    caching a portion of said information in a subsystem supplemental memory; and
    accessing said subsystem supplemental memory to perform storage operations for a discrete main processing component, wherein said accessing said subsystem supplemental memory includes writing and reading directly between said subsystem supplemental memory and said discrete main processing component, and wherein a discrete graphics processor has priority to said subsystem supplemental memory when both said discrete main system processing component and said discrete graphics processor want access to said subsystem supplemental memory.

11. A supplemental caching method of claim 10 further comprising swapping said portion of said information between a main system memory and said subsystem supplemental memory.

12. A supplemental caching method of claim 10 further comprising performing a subsystem supplemental coordination process.

13. A supplemental caching method of claim 10 wherein said subsystem supplemental coordination process comprises writing information from said subsystem supplemental memory to said bulk storage component if a subsystem operation is initiated.

14. A supplemental caching method of claim 10 wherein a subsystem attempts to store subsystem related information in said subsystem supplemental memory.

15. A supplemental caching method of claim 10 further comprising caching another portion of said information in a main memory.

16. A supplemental caching method of claim 10 further comprising writing information between said subsystem supplemental memory and said main memory.

17. A graphics subsystem comprising:
    a graphics bus for communicating information;
    a graphics processor for processing graphics information; and a graphics memory for storing graphics information and portions of bulk information associated with non-graphics applications, wherein said portions of bulk information associated with non-graphics applications are written and read directly between said subsystem supplemental memory and a discrete main system processor, and wherein said graphics processor has priority to said graphics memory when both said discrete main system processor and said graphics processor want access to said graphics memory.

18. A graphics subsystem of claim 17 wherein said graphics memory includes a frame buffer memory.

19. A graphics subsystem of claim 17 wherein a main system memory and said graphics memory swap said portions of bulk information associated with non-graphics applications between one another.

* * * * *